UNITED STATES PATENT OFFICE.

HERMANN VIETH, OF LUDWIGSHAFEN-ON-THE-RHINE, GERMANY, ASSIGNOR TO KNOLL & CO., OF LUDWIGSHAFEN, GERMANY, A FIRM.

SANTALOL CARBONATE.

No. 862,857.  Specification of Letters Patent.  Patented Aug. 6, 1907.

Original application filed November 8, 1905, Serial No. 286,441. Divided and this application filed March 22, 1907. Serial No. 363,930. (Specimens.)

*To all whom it may concern:*

Be it known that I, HERMANN VIETH, Ph. D., a citizen of the Empire of Germany, residing in Ludwigshafen-on-the-Rhine, in said Empire of Germany, have invented certain new and useful Improvements in Neutral Acidesters of the Sandalwood-Oil and Processes of Making the Same, of which the following is a specification.

Sandalwood oil consists mainly of a mixture of two isomere terpene alcohols, santalol A and santalol B, which have almost the same properties and the same characteristics when subjected to esterification. The specific gravity of pure sandalwood oil is about 0.98.

The preparations made from sandalwood oil are largely used in the treatment of diseases of the bladder, but they are objectionable on account of their disagreeable taste and the irritating effect which they exert on the stomach and other internal organs. The already known acetyl derivatives, and even in a higher degree the acid phthalic acidester, are open to the same objection. I have discovered that these disadvantages of the sandalwood oil and its preparations can be obviated by converting them into neutral esters of the monobasic aromatic acids, such as benzoic acid, salicylic acid and cinnamic acid, which form the subject-matter of a separate application for Letters Patent, filed November 8, 1905, Serial No. 286,441. I have also found that sandalwood oil forms with the neutral esters of the multibasic acids, especially carbonic acid, insipid and non-irritating substances which are better adapted for medicinal use than the ordinary sandalwood oil.

The neutral carbonic acid ester of santalol is prepared in the following manner according to the following equation:

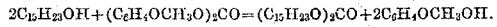

$$2C_{15}H_{23}OH + (C_6H_4OCH_3O)_2CO = (C_{15}H_{23}O)_2CO + 2C_6H_4OCH_3OH.$$

1 kilogram of guaiacol carbonate is heated with 2 kilograms of santalol, preferably *in vacuo*, to about 170 to 180° C., until all the guaiacol is distilled off. The remaining santalol carbonate, a thick yellowish oil, is readily freed of unconverted guaiacol carbonate and santalol by washing with diluted alcohol until the oil remaining undissolved does not taste any more of santalol. Santalol and guaiacol carbonate are both dissolved by diluted alcohol. The guaiacol carbonate may be replaced by other carbonates, such as diphenyl carbonate, and santalol by the corresponding quantity of sandalwood oil.

The santalol carbonate is a light-colored oil of neutral reaction. Its specific gravity is 1.0582 at 15° C. It is almost tasteless and odorless and insoluble in water; it splits, when heated with alcoholic soda lye, into carbonic acid and santalol. It dissolves an absolute alcohol, ether and chloroform in the cold; its solubility in alcohol decreases with the dilution of the same.

Having thus described my invention, I claim as new and desire to secure by Letters Patent:

1. The process herein described of producing insipid neutral carbonic acid esters of santalol, which consists in heating sandalwood oil with neutral carbonic acid esters, and then washing the product with diluted alcohol for removing the unconverted carbonic acid esters and santalol.

2. As a new article of manufacture, insipid neutral carbonic acid esters of santalol, obtained by reacting sandalwood oil with neutral carbonic acid esters, forming a thick yellowish oil of a specific gravity of about 1.0582 which, when heated with an alcoholic solution of caustic soda, is split into santalol and sodium carbonate, and dissolving in alcohol, ether and chloroform in the cold, its solubility in alcohol decreasing with the dilution of the same.

In testimony, that I claim the foregoing as my invention, I have signed my name in presence of two subscribing witnesses.

HERMANN VIETH.

Witnesses:
 OSWALD KRUG,
 JOS. H. LEUTE.